Figure 1:
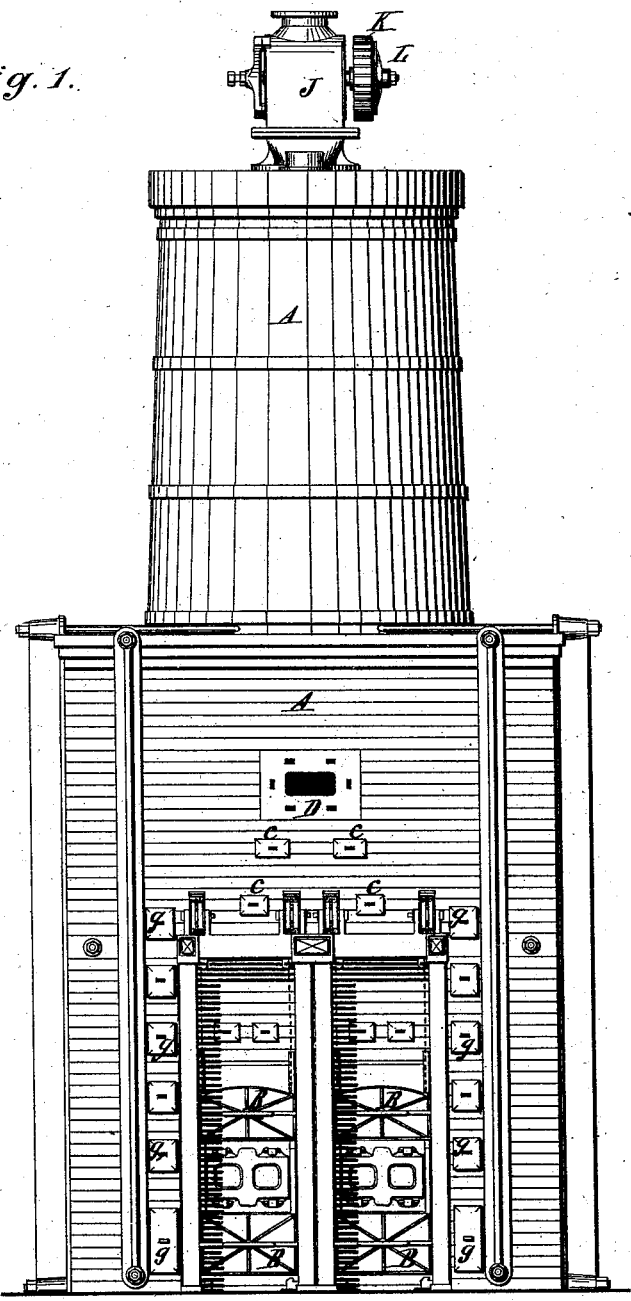

4 Sheets—Sheet 1.

H. Y. ATTRILL & W. FARMER.
Apparatus for the Manufacture of Gas.

No. 224,320. Patented Feb. 10, 1880.

Witnesses;
W. Colborne Brookes
Charles C. Stetson

Inventors;
Henry Y. Attrill
William Farmer
by their attorney
J. L. Stetson

4 Sheets—Sheet 4.

H. Y. ATTRILL & W. FARMER.
Apparatus for the Manufacture of Gas.

No. 224,320.  Patented Feb. 10, 1880.

Fig. 10.

Witnesses,
W. Colborne Brookes
Charles C. Stetson

Inventors,
H. Y. Attrill
Wm. Farmer
by their attorney
Thomas D. Stetson

UNITED STATES PATENT OFFICE.

HENRY Y. ATTRILL AND WILLIAM FARMER, OF NEW YORK, N. Y.; SAID FARMER ASSIGNOR TO SAID ATTRILL.

APPARATUS FOR THE MANUFACTURE OF GAS.

SPECIFICATION forming part of Letters Patent No. 224,320, dated February 10, 1880.

Application filed November 26, 1879.

*To all whom it may concern:*

Be it known that we, HENRY Y. ATTRILL and WILLIAM FARMER, both of New York city, in the State of New York, have invented certain new and useful Improvements in Apparatus for the Manufacture of Gas for Illuminating and Heating Purposes, of which the following is a specification.

We employ an apparatus in which the coal or other gas-producing material in lumps or masses affording sufficient interstices is fed in at the top of an upright, or nearly upright, passage, which we term the "retort," and gradually descends therein during the period both of the production of illuminating-gas while it is subjected to ordinary distillation and during the period of its consumption by burning, which takes place in the lower portion of the same passage or of a branch thereof.

The gas is taken away at points low down, so the gas driven out from the freshly-charged material near the top is drawn down among the hotter material below, and the decomposition or destructive distillation of all vapors is thoroughly effected. This is very important when petroleum or analogous volatile material is mingled with the solid matter.

As described in a previous application for patent by us, we provide for taking away gas at two different levels in two different conditions. In the use of good gas-coal the first gas is taken away at the mid-height, and is rich or illuminating gas, while the later product is taken out from the furnace where the whole or portion of the coke is burned, and is largely carbonic oxide and poor hydrocarbon gas, or a mixture highly valuable for heating purposes, and which we will term "furnace-gas." A portion of the furnace-gas is supplied with fresh air at a higher point, and by burning around the upper part of the retort supplies heat thereto. The remainder of the furnace-gas may be led away and utilized as a heating-gas for other purposes.

The matter so far described has been set forth in another application for patent filed by us on or about September 26, 1879.

Our present invention provides for drawing out a portion of the coke unburned. The retort is divided in the lower portion into two gradually-diverging branches, each of which branches may be, and preferably is, again further divided. As the material descends it is divided, one portion descending into a branch or branches, where it is supplied with air and burned into the feebly-illuminating, but highly-heating, furnace-gas, while another portion descends into a branch where it gets no air and is cooled and drawn out. We furnish both branches with grates and provisions for use as furnaces, when desired, so that with this apparatus, as with the single base, all the material can be manufactured into heating-gas, if desired, after the first and richest gas has been separately taken away above.

The accompanying drawings form a part of this specification, and represent what we consider the best means of carrying out our invention.

Figure 2:
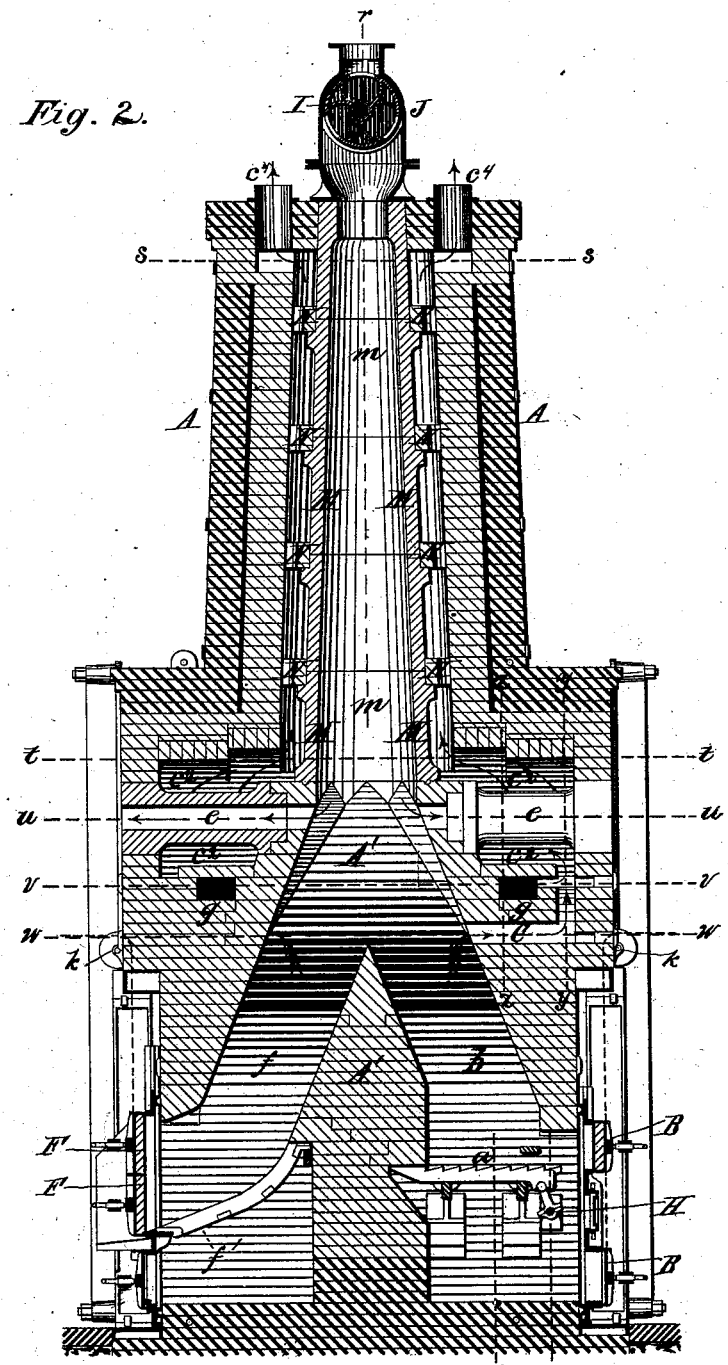
Figure 3:
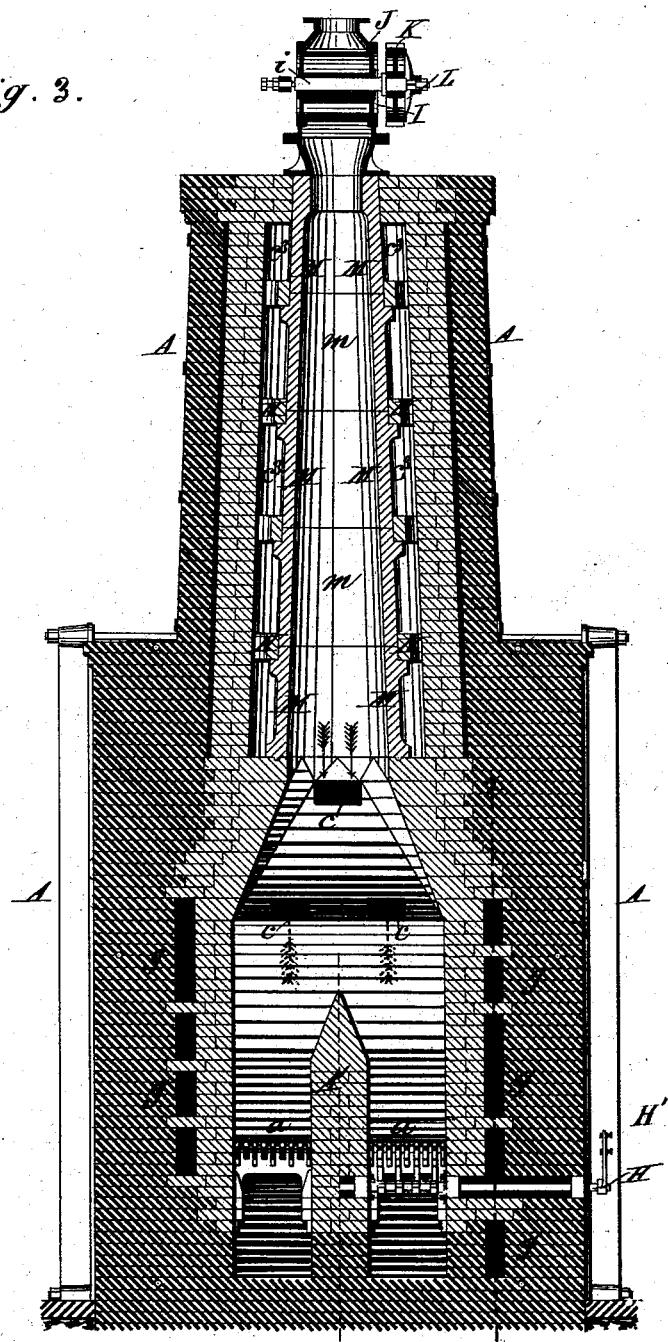
Figure 4:
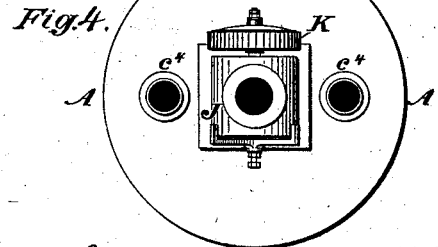
Figure 5:
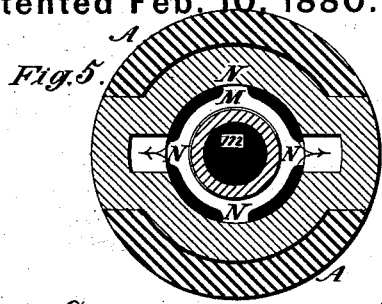
Figures 6, 7:
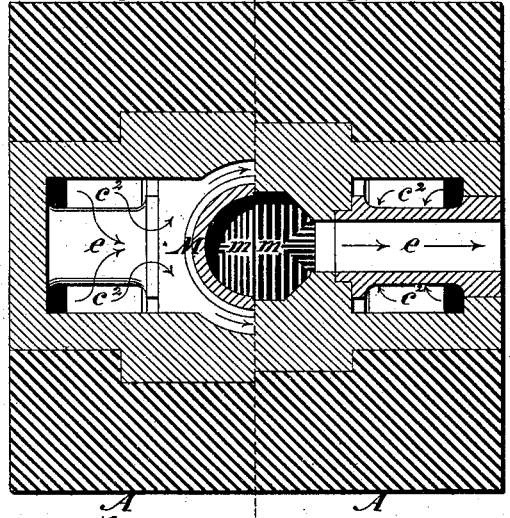
Figures 8, 9:
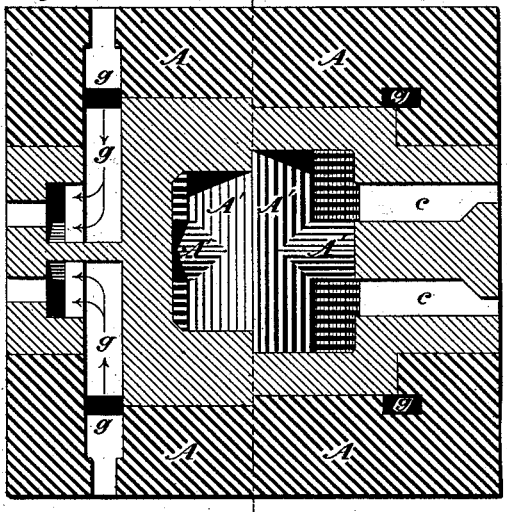
Figure 11:
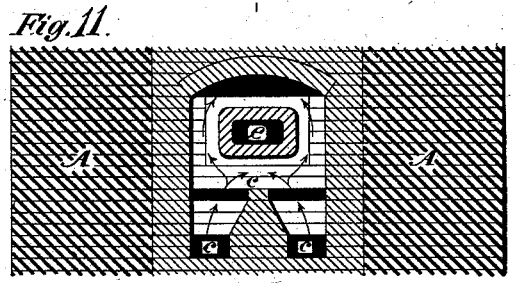
Figure 12:
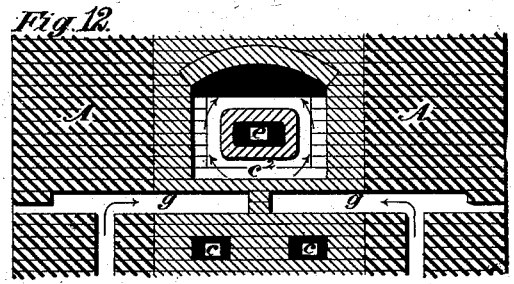

Figure 1 is a front elevation of our improved apparatus. Fig. 2 is a vertical section of the same. Fig. 3 is a section on the line $r\,r$ in Fig. 2. Fig. 4 is a plan view of the top of the apparatus. Fig. 5 is a horizontal section on the line $s\,s$ in Fig. 2. Fig. 6 is a horizontal section on the line $t\,t$ in Fig. 2 through half of the apparatus. Fig. 7 is a horizontal section through half of the apparatus on the line $u\,u$ in Fig. 2. Fig. 8 is a horizontal section on the line $v\,v$. Fig. 9 is a section on the line $w\,w$. All these are only through half of the apparatus, but the other half at that level is similar. Fig. 10 is a vertical section on the line $x\,x$ in Fig. 3. This shows the fresh-air flues. Fig. 11 is a vertical section on the line $y\,y$ in Fig. 2. This shows the passages through which illuminating-gas is taken away; and Fig. 12 is a vertical section parallel to the last, but a little farther inward. Its plane is represented by the line $z\,z$ in Fig. 2.

Similar letters of reference indicate like parts in all the figures.

A is substantial masonry inclosing a central upright passage, $m$, which will be termed the "retort." It is lined with a continuous tight wall of thin refractory material, as firebrick, formed as a continuous tube in large or small sections properly joined, as may be preferred.

A space between the lining and the outer masonry serves as an annular flue to conduct the burning gases from below and supply heat to the contents at the top.

At or near the radial passages e, which conduct away the rich illuminating-gas, the descending material divides. One portion descends into the furnace b, and is burned with a limited supply of air, making illuminating-gas in the top of the apparatus and heating-gas in the bottom, and all the solid matter being burned, always excepting ashes and clinker, which may be removed as usual. Another portion of the coke descends into the other portion, f, of the branched passage, which we will term the "coke-vault," from whence it is withdrawn for subsequent use.

We can make the proportion thus conducted down into the coke-vault greater or less by varying the rapidity or frequency of its removal from the latter. If much is removed from the coke-vault a large proportion will descend therein. If little is removed from that chamber a larger proportion will go down into the furnace. If none at all is removed from the coke-vault it will stand idly filled with dead coke, the whole of the descending stream of coke being led necessarily into the other chamber, (the furnace,) where it is consumed.

In the drawings we have shown two coke-vaults, f, divided apart by a wall at right angles to the main dividing-wall A'. We can thus divide each coke-vault and each furnace into any desired number of subdivisions.

Each coke-vault is provided with inclined grates f', which guide the coke down to the door, when the coke is removed, or which allow the coke-vault to be employed as a furnace whenever it is desired to so work the apparatus—that is to say, burning all the coke with a limited supply of air in both or all the chambers. It will be understood that the air flowing to and through the grate f' is controlled by tightly-closing doors.

F are the doors of the coke-vault, through which coke is removed for use.

Means (not shown) may be employed for cooling the coke either before or after its removal from the vault. We propose to let in a little steam under the grates. In the furnace b it is applied under the grates and cools them and softens the clinkers. In the coke-vault f it may be introduced below the grate f', or at any other convenient point, and will aid to quench the coke and prepare it for removal.

The feeder consists of a cast-iron cylinder, I, formed with pockets and mounted on a shaft, i, with which it revolves in gas-tight contact with an outer case, J, by power received through the gear-wheel K. The gear-wheel is capable of turning loosely on the shaft, but engages frictionally, thereby allowing for the presence, without mischief, of an occasional mass too hard to be passed through. The friction-plate L can be tightened or released by any convenient means to regulate the frictional force.

The feeder I J may be mounted, as shown, exactly over the center of the retort, or it may be set considerably to one side. The latter may be preferable in many cases.

The coal or other material may be conveyed to the feeder I J by hand or by elevators, cars, or other machinery. The feeder may be driven by any suitable power, and revolved continuously and slowly or intermittently, as convenience may decide.

An index or register on the shaft i of the feeder, or its connections, may aid in determining the quantity of material consumed in any given time.

We have shaking-grates on the furnaces. A similar device may be employed also in the inclined grates of the coke-vault. One portion of the grates is moved to and fro by means of a lever, H', fixed on a rocking shaft, H, worked by any suitable force. Between each pair of movable grate-bars we have a stationary bar. This, as also many of the other details, may be varied within wide limits without departing from the principle or sacrificing the advantages of the invention.

We can use this apparatus to manufacture water-gas. We introduce the steam through one or more pipes (not shown) either at the bottom or top, and the action that ensues when the apparatus is filled with coke or analogous material is similar to that in other water-gas apparatus, the oxygen of the steam combining with the carbon, producing carbonic oxide, and the hydrogen of the steam being set free, the whole issuing mechanically mingled in good condition for use with or without subsequent treatment. In such case we can revive the heat from time to time by shutting off the steam, and by opening suitable passages allow fresh air to move through the mass of glowing coke, inducing ordinary combustion and passing the gases then produced to the stack to be discharged.

We propose to use the apparatus for the production of water-gas simultaneously with the manufacture of the two kinds of gas from coal. This may be done by admitting the steam in moderate quantities, preferably at or near the bottom, and taking care not to so far cool the material as to destroy its decomposing power.

We believe we can successfully impart the heat from the outside flue, so as to decompose a small quantity of steam admitted at the top of the apparatus and caused to mingle with the rich gas. In other words, we can make water-gas in a certain proportion with either or both the kinds of gas made by our apparatus, worked with gas-coal or analogous gas-producing material.

It will be understood that we use exhausters or other devices to keep the exactly required pressure on all parts of the interior of the apparatus. We draw out the gas from the lower part of the material through the passages c for heating purposes, and through the apertures or radial pipes e for illuminating purposes, at such rates that there shall be a neutral zone at a slightly varying level between them where the current of gas in the interstices between the lumps of coal or coke divides—that is to say, all above that zone moves upward to the rich-gas exit e, and all below that zone moves downward to the poor-gas exit c.

The clearing of the fire is largely effected by the shaking grate. Both sets of bars, those moved by the arms H' and those which are stationary between them, are notched or toothed, the teeth being formed with unequal sides, as shown, so that the shaking of the grate by rocking the shaft H works the clinkers and ashes to the front of the grate, where a small narrow passage will allow their discharge. The device in this combination serves the important end of avoiding the necessity for opening the doors wide and allowing free access of the air, as would be required for ordinary stoking.

We claim as our invention—

1. The vertical retort described, branched near the base and equipped, one branch with provisions for burning, and the other with provisions for withdrawing the solid matter descending therein, as herein specified.

2. The upright retort, branched as described, in combination with the inclined grate $f'$ in one of the branches, arranged to serve at will either for the extraction or the combustion of the solid matter received in that branch, as herein specified.

3. In combination with the upright gas-retort $m$, operating continuously, as specified, and the automatic revolving feeder I J, for supplying the gas-producing material without allowing the passage of air or gas, the friction-coupling L K, adapted to allow the feeder to stop with too great resistance, as specified.

In testimony whereof we have hereunto set our hands this 20th day of November, 1879, in the presence of two subscribing witnesses.

HENRY Y. ATTRILL.
WILLIAM FARMER.

Witnesses:
W. COLBORNE BROOKES,
GEO. C. LLOYD.